US008663365B2

United States Patent
Willauer et al.

(10) Patent No.: US 8,663,365 B2
(45) Date of Patent: Mar. 4, 2014

(54) METHOD FOR THE CONTINUOUS RECOVERY OF CARBON DIOXIDE FROM ACIDIFIED SEAWATER

(75) Inventors: Heather D. Willauer, Fairfax Station, VA (US); John Barile, Summit Point, WV (US); Felice DiMascio, Rock Hill, CT (US); Dennis R Hardy, Alexandria, VA (US); Frederick Williams, Accokeek, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/571,383

(22) Filed: Aug. 10, 2012

(65) Prior Publication Data

US 2013/0039837 A1    Feb. 14, 2013

Related U.S. Application Data

(60) Provisional application No. 61/522,743, filed on Aug. 12, 2011.

(51) Int. Cl.
*B01D 53/22* (2006.01)
*B01D 59/12* (2006.01)
*B01D 15/00* (2006.01)
*C02F 1/44* (2006.01)

(52) U.S. Cl.
USPC .................................. 95/51; 95/45; 210/640

(58) Field of Classification Search
USPC ........................ 210/640, 900, 652; 95/45, 51
See application file for complete search history.

(56) References Cited

U.S. PATENT DOCUMENTS 5,910,448 A * 6/1999 Atwater et al. ............... 436/133
8,313,557 B2 * 11/2012 Willauer et al. .................. 95/51

* cited by examiner

*Primary Examiner* — Ana Fortuna
(74) *Attorney, Agent, or Firm* — US Naval Research Laboratory; Rebecca L. Forman

(57) ABSTRACT

A method for recovering carbon dioxide from acidified seawater using a membrane contactor and passing seawater with a pH less than or equal to 6 over the outside of a hollow fiber membrane tube while applying vacuum or a hydrogen sweep gas to the inside of the hollow fiber membrane tube, wherein up to 92% of the re-equilibrated $[CO_2]_T$ is removed from the natural seawater.

6 Claims, 4 Drawing Sheets

METHOD FOR THE CONTINUOUS RECOVERY OF CARBON DIOXIDE FROM ACIDIFIED SEAWATER

PRIORITY CLAIM

This Application claims priority from U.S. Provisional Application No. 61/522,743 filed on Aug. 12, 2011 by Heather D Willauer et al., entitled "METHOD FOR THE CONTINUOUS RECOVERY OF CARBON DIOXIDE FROM ACIDIFIED SEAWATER," the entire contents of which are incorporated herein by reference.

BACKGROUND OF THE INVENTION

1. Field of the Invention

The present invention relates generally to $CO_2$ extraction and, more specifically, to recovery of $CO_2$ from acidified natural seawater.

2. Description of the Prior Art

The total carbon content of the world's oceans is roughly 38,000 GtC (gigaton of carbon). Over 95% of this carbon is in the form of dissolved bicarbonate ion ($HCO_3^-$). This ion along with carbonate is responsible for buffering and maintaining the ocean's pH, which is relatively constant below the first 100 meters. This dissolved bicarbonate and carbonate is essentially bound $CO_2$, and as shown in equation (1), the sum of these species along with gaseous $CO_2$ represents the total carbon dioxide concentration $[CO_2]_T$ of seawater, defined as:

$$[CO_2]_T=[CO_2(g)]+[HCO_3^-]+[CO_3^{2-}] \quad (1)$$

At a typical ocean pH of 7.8, $[CO_2]_T$ is about 2000 µmoles/kg near the surface and 2400 µmoles at depths below 300 meters. Takahashi et al., "The Alkalinity and Total Carbon Dioxide Concentration in the World Oceans," *Carbon Cycle Modeling*, John Wiley and Sons, New-York, 271-286 (1981); Takahashi et al., "Carbonate Chemistry of the Surface of the Waters of the World Oceans," *Isotope Marine Chemistry*, Uchida Rokakuho, Tokyo, Japan, 291-326 (1980), the entire contents of each are incorporated herein by reference. This equates to approximately 100 mg/L of $[CO_2]_T$ of which 2 to 3% is $CO_2$ (g), 1% is dissolved carbonate, and the remainder is dissolved bicarbonate. The acidification of natural seawater offers an indirect approach to recovery of $CO_2$ from its bicarbonate and carbonate form from the equilibrium conditions of $CO_2$ in seawater shown in equation (2). Johnson et al., "Coulometric TCO$_2$ Analyses for Marine Studies: An Introduction," *Marine Chem.*, 16, 61 (1985), the entire contents of which is incorporated herein by reference. Johnson et al. demonstrated that carbonate and bicarbonate re-equilibrate to $CO_2$ gas at seawater pH less than or equal to 6. This method has been the basis for standard quantitative ocean $CO_2$ measurements for over 25 years.

$$HCO_3^-+H^+ \leftrightarrows H_2CO_3 \leftrightarrows H_2O+CO_2(g)\uparrow \quad (2)$$

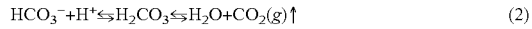

An electrochemical method to acidify seawater and recover $[CO_2]_T$ simultaneously with hydrogen gas from alkaline water sources such as seawater has been developed at the Naval Research Laboratory. (U.S. patent application Ser. No. 12/958,963 filed on Nov. 17, 2011 by Felice DiMascio, the entire contents of which are incorporated herein by reference.) FIG. 1 illustrates the percent removal of $[CO_2]_T$ plotted as a function of pH for effluent seawater samples taken from the electrochemical acidification cell during a 40 minute constant polarity cycle. This figure indicates that approximately 50% of the $[CO_2]_T$ is spontaneously degassed from the effluent natural seawater at pH ≤4. To complement this technology, the Naval Research Laboratory has developed the present invention to enhance re-equilibrated $[CO_2]_T$ (see equation 2) recovery up to 92% from seawater at pH of ≤4.

BRIEF SUMMARY OF THE INVENTION

The present invention provides a method for recovering re-equilibrated $[CO_2]_T$ from acidified natural seawater using a membrane contactor and passing seawater with a pH ≤6 over the outside of the hollow fiber membrane tube while applying vacuum or a hydrogen sweep gas to the inside of the membrane tube, wherein up to 92% of the re-equilibrated $[CO_2]_T$ (see equation 2) is removed from the natural seawater.

The method of the present invention requires only vacuum or a sweep gas to recover low concentrations of $CO_2$ from acidified seawater (~50 mg/L). In the case of vacuum, $CO_2$ can be concentrated in proportions needed for feedstock. In the case of hydrogen as a sweep gas, no additional energy penalty is required to recover the $CO_2$. The hydrogen/$CO_2$ mixture produced in the acidification of the seawater can be used directly as a feedstock.

These and other features and advantages of the invention, as well as the invention itself, will become better understood by reference to the following detailed description, appended claims, and accompanying drawings.

DETAILED DESCRIPTION OF THE INVENTION

The present invention generally relates to the continuous recovery of re-equilibrated $[CO_2]_T$ from acidified natural seawater. A hollow fiber membrane contactor is used to increase the seawater surface area. A vacuum is applied to the inside of hollow fiber membrane tubes in the contactor as effluent seawater is passed over the outside of the hollow fiber membrane tubes. Alternatively, the vacuum can be replaced with a hydrogen sweep gas on the inside of the hollow fiber membrane tubes. Using either method, up to 92% of the re-equilibrated $[CO_2]_T$ in seawater can be removed.

The present invention provides an efficient method to recover up to 92% of the re-equilibrated carbon dioxide from acidified natural seawater in flowing systems. At seawater pH below or equal to 6 it is not readily obvious that only a fraction (up to 50 mg/L or 50% recovery) of re-equilibrated $[CO_2]_T$ in acidified natural seawater will spontaneously degas in flowing systems. The solubility of re-equilibrated $[CO_2]_T$ in natural seawater requires additional mechanisms that increase seawater surface area so that up to 92% of the re-equilibrated $[CO_2]_T$ can be recovered from the acidified natural seawater in flowing systems.

The re-equilibration of $[CO_2]_T$ shown in equation 2 from dissolved carbonate and bicarbonate in natural seawater and its solubility is dependent on carbonate and bicarbonate speciation, seawater temperature, salinity, pressure, and ion association. Warmer seawater temperatures and higher salt concentrations change the bicarbonate and carbonate equilibrium with the dissolved $CO_2$ in the form of carbonic acid, and the overall $CO_2$ solubility in the solution.

It is known that $CO_2$ gas solubility is reduced in aqueous salt solutions compared to deionized water solutions. (Follows et al., "On the solution of the carbonate chemistry system in ocean biogeochemistry models," *Ocean Modelling*, 12, 290-301 (2006); Al.-Anezi et al., "Scale formation in desalination plants: effect of carbon dioxide solubility," *Desalination*, 204, 385-402 (2007); Al.-Anezi et al., "Parameters affecting the solubility of carbon dioxide in seawater at the conditions encountered in MSF desalination plants," *Desalination*, 222, 548-571 (2008); Willauer et al., "Development of an Electrochemical Acidification Cell for Recovery of CO2 and H2 from Seawater II. Evaluation of the Cell by Natural Seawater," Industrial & Engineer Chem. Res., DOI: 10.1021/ie301006y (2 Aug. 2012), the entire contents of each are incorporated herein by reference.) As saltwater salinity increases and seawater temperatures increase, LeChatlier's Principle dictates equilibrium shift to the left (Equation 2). The result is a decrease in $CO_2$ solubility that leads to the greater ease of degassing of $CO_2$ from the seawater. Changes in $CO_2$ solubility result in changes in vacuum requirements needed to recover up to 92% of $[CO_2]_T$ for the enclosed invention.

Figure 1:
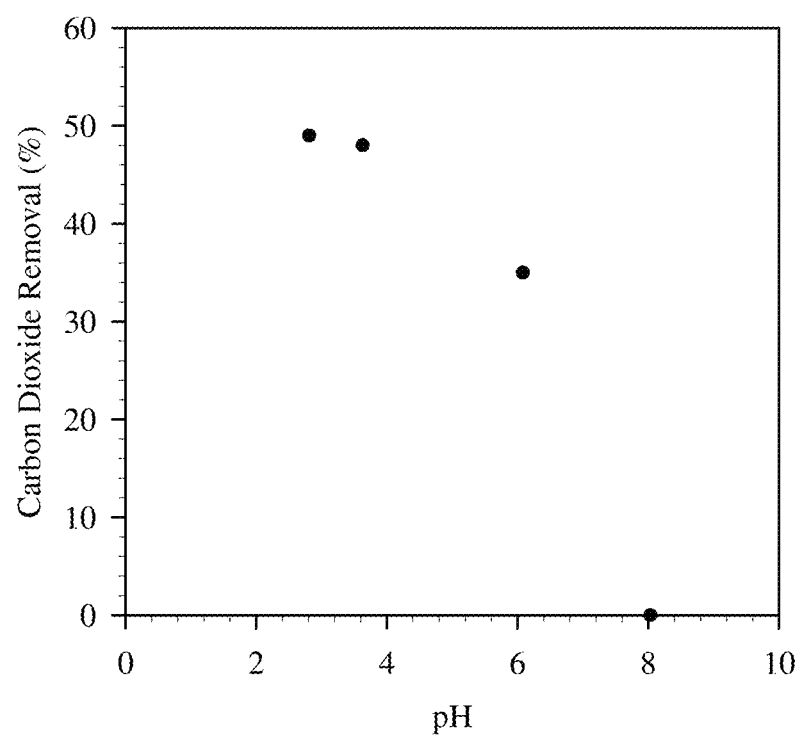
FIG. 1 is a plot of re-equilibrated $[CO_2]_T$ spontaneous degassing as a function of pH for effluent natural seawater samples taken from the electrochemical acidification cell during a 40 minute constant polarity cycle at 20 amps and seawater flow rate of 0.5 gal/minute.
Figure 2:
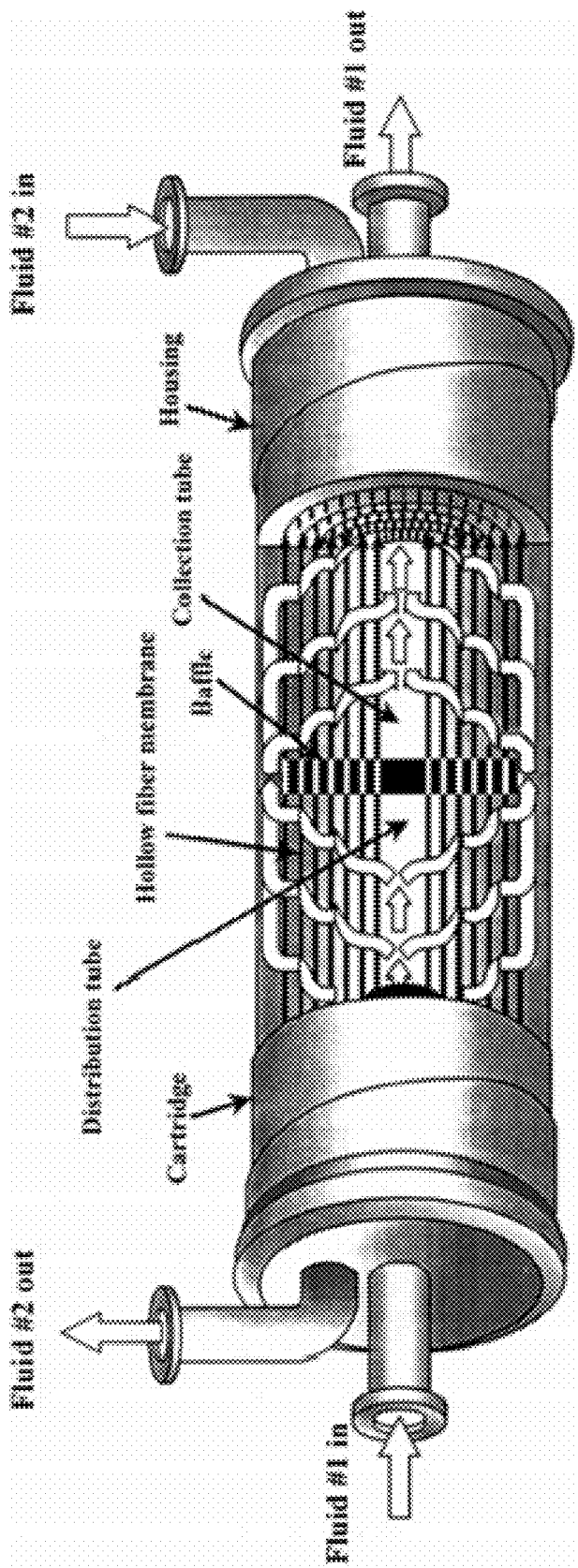
FIG. 2 is a schematic diagram of a polyethylene hollow fiber membrane contactor.

FIG. 2 is a diagram of a Liqui-Cel® polyethylene hollow fiber membrane contactor. Gas permeable membranes are available commercially for the removal or addition of gases from liquids. Most of these applications are near atmospheric pressure and include water purification, blood oxygenation and artificial lung devices. However, some are operated at higher pressures, such as beverage carbonation. These membranes work on the principle of dissolved gases such as carbon dioxide diffusing across the membrane through the pores as a function of differential partial gas pressures.

Figure 3:
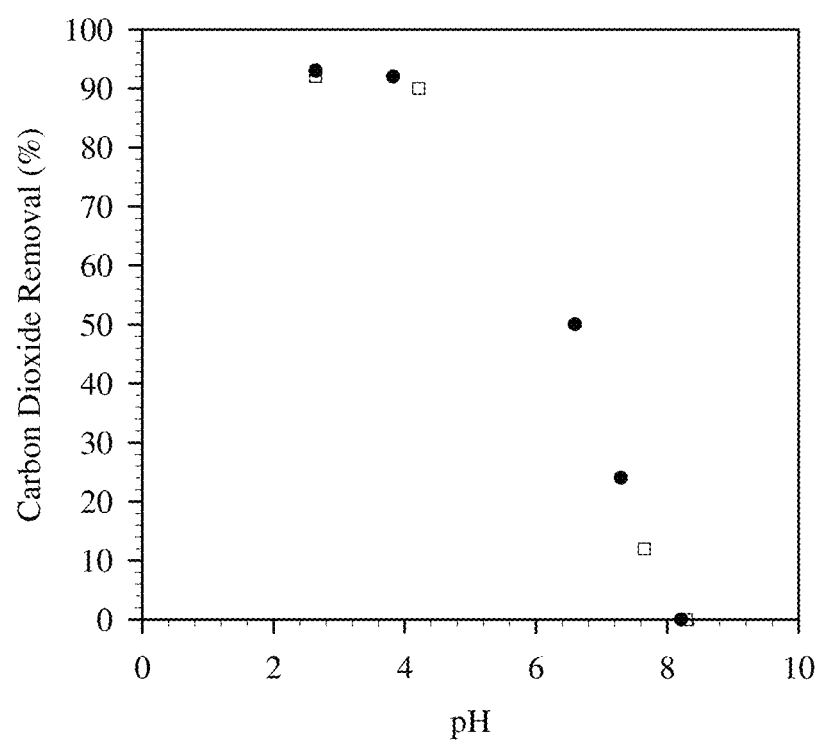
FIG. 3 is a plot of re-equilibrated $[CO_2]_T$ removal as a function of pH for effluent natural seawater samples taken from the electrochemical acidification cell during two consecutive 45 minute constant polarity cycles at 20 amps after contact with hollow fiber membrane contactor at a seawater flow rate of 0.5 gal/minute and vacuum conditions ~30 inches of Hg.

A Liqui-Cel® polyethylene hollow fiber membrane contactor was used as a method to increase natural seawater surface area and thus increase re-equilibrated $[CO_2]_T$ recovery from natural seawater at pH ≤6. Up to 30 inches of Hg vacuum was applied by a vacuum pump to the inside of the hollow fiber membrane tubes in the contactor as effluent natural seawater passed over the outside of the hollow fiber membrane tubes at a flow rate of 0.5 gallons/minute. FIG. 3 shows the percent removal of re-equilibrated $[CO_2]_T$ plotted as a function of effluent seawater pH for two consecutive 45 minute polarity cycles at 20 amps of applied current. From FIG. 3, it is clear up to 92% of the re-equilibrated $[CO_2]_T$ was removed from the effluent seawater at pH ≤4 at high vacuum conditions (~30 inches of Hg). As the effluent seawater pH was lowered further to 2.6, no measureable increase in $CO_2$ removal was observed.

Since the removal of gases is a function of differential partial gas pressures and hydrogen is being produced at the cathode of the electrochemical cell at a 3 to 1 ratio of $H_2$ to $CO_2$, hydrogen was used as a sweep gas in replacement of the vacuum on the inside of the hollow fiber membrane tubes. Using hydrogen as the sweep gas enables the gases to be pre-mixed before being used as the feedstock in hydrogenation to value added hydrocarbons. This method also saves additional energies that would be expended by using a vacuum pump.

Figure 4:
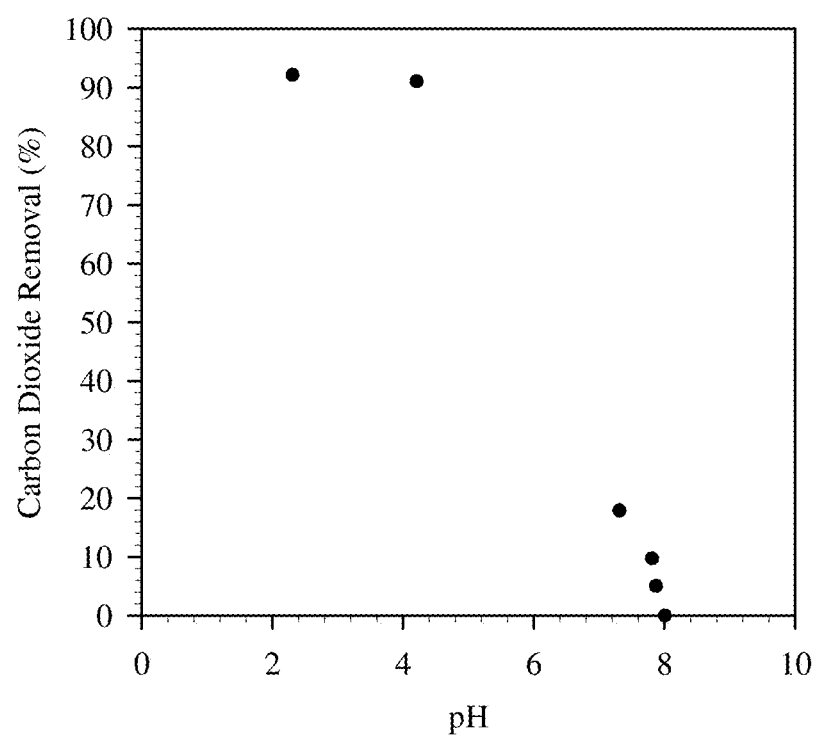
FIG. 4 is a plot of re-equilibrated $[CO_2]_T$ removal as a function of pH for effluent natural seawater samples taken from the electrochemical acidification cell during a 30 minute constant polarity cycles at 30 amps after contact with hollow fiber membrane contactor at seawater flow rate of 0.5 gal/minute and hydrogen sweep gas flow rates of ~1500 mL/min.

FIG. 4 shows that when hydrogen is used as the sweep gas at ~1500 mL/min, re-equilibrated $[CO_2]_T$ recovery is up to 92%. Table 1 indicates that as hydrogen concentration is decreased from ~1500 mL/min to 360 mL/min, re-equilibrated $[CO_2]_T$ recovery is reduced from up to 92% to 69%. At a hydrogen flow rate of 160 mL/min there is no measurable increase in re-equilibrated $[CO_2]_T$ recovery above the 49% removed by spontaneous degassing.

TABLE 1

Re-equilibrated $[CO_2]_T$ removal as a function of hydrogen sweep gas flow rates for effluent natural seawater samples at pH ≤3.

| Sample | Hydrogen Gas Sweep (mL/min) | $CO_2$ Removal (%) |
|---|---|---|
| 1 | ~1500 | 92 |
| 2 | ~360 | 69 |
| 3 | ~160 | 49 |

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for the recovery of re-equilibrated $[CO_2]_T$ from acidified natural seawater, comprising:
   passing natural seawater with a pH less than or equal to 6 over the outside of a hollow fiber membrane tube in a membrane contactor; and
   simultaneously applying vacuum to the inside of the hollow fiber membrane tube;
   wherein 69% to 92% of the re-equilibrated $[CO_2]_T$ is removed from the natural seawater.

2. The method of claim 1, wherein the vacuum applied is greater than zero to 30 inches of Hg.

3. The method of claim 1, wherein the seawater has a pH less than or equal to 4.

4. A method for the recovery of re-equilibrated $[CO_2]_T$ from acidified natural seawater, comprising:
   passing seawater with a pH less than or equal to 6 over the outside of a hollow fiber membrane tube in a membrane contactor; and
   simultaneously using hydrogen as a sweep gas on the inside of the hollow fiber membrane tube at a flow rate of 360 mL/min or higher;
   wherein 69 to 92% of the carbon dioxide is removed from the natural seawater.

5. The method of claim 4, wherein the hydrogen sweep gas has a flow rate of 1500 mL/min.

6. The method of claim 4, wherein the seawater has a pH less than or equal to 4.

* * * * *